US006621641B2

(12) United States Patent
Takatsuki

(10) Patent No.: US 6,621,641 B2
(45) Date of Patent: Sep. 16, 2003

(54) RETRO-FOCUS-TYPE CAMERA LENS

(75) Inventor: Akiko Takatsuki, Saitama (JP)

(73) Assignee: Fuji Photo Optical Co., Ltd., Saitama City (JP)

( * ) Notice: Subject to any disclaimer, the term of this patent is extended or adjusted under 35 U.S.C. 154(b) by 0 days.

(21) Appl. No.: 10/058,003

(22) Filed: Jan. 29, 2002

(65) Prior Publication Data

US 2002/0159163 A1 Oct. 31, 2002

(30) Foreign Application Priority Data

Feb. 27, 2001 (JP) ........................... 2001-051547

(51) Int. Cl.[7] .................. G02B 15/14; G02B 9/00; G02B 13/04
(52) U.S. Cl. .................. 359/680; 359/753; 359/740
(58) Field of Search .................. 359/749–755, 359/739–740, 680

(56) References Cited

U.S. PATENT DOCUMENTS 4,431,273 A * 2/1984 Nakamura .................. 359/708
5,742,439 A * 4/1998 Schuster .................... 359/749

FOREIGN PATENT DOCUMENTS

| JP | 5-134174 | | 5/1993 |
| JP | 07270680 A | * | 10/1995 |
| JP | 09043511 A | * | 2/1997 |
| JP | 9-292565 | | 11/1997 |

* cited by examiner

*Primary Examiner*—Georgia Epps
*Assistant Examiner*—William Choi
(74) *Attorney, Agent, or Firm*—Arnold International; Bruce Y. Arnold

(57) ABSTRACT

A retro-focus-type camera lens is disclosed that is formed of, in order from the object side: a front lens group having negative refractive power, a diaphragm, and a rear lens group having positive refractive power. The front lens group is formed of, in order from the object side, a positive lens element and two negative lens elements, and the rear lens group is formed of, in order from the object side, a positive lens element, two sets of lens elements that are cemented together to form two joined lenses, and a positive lens element. Various conditions are preferably satisfied in order to provide a lens having an image angle of about 38°, an F number of about 1.4, and which suppresses the occurrence of color shading while providing a sufficient back focus to insert a color separation optical system between the retro-focus-type camera lens and the image plane.

6 Claims, 6 Drawing Sheets

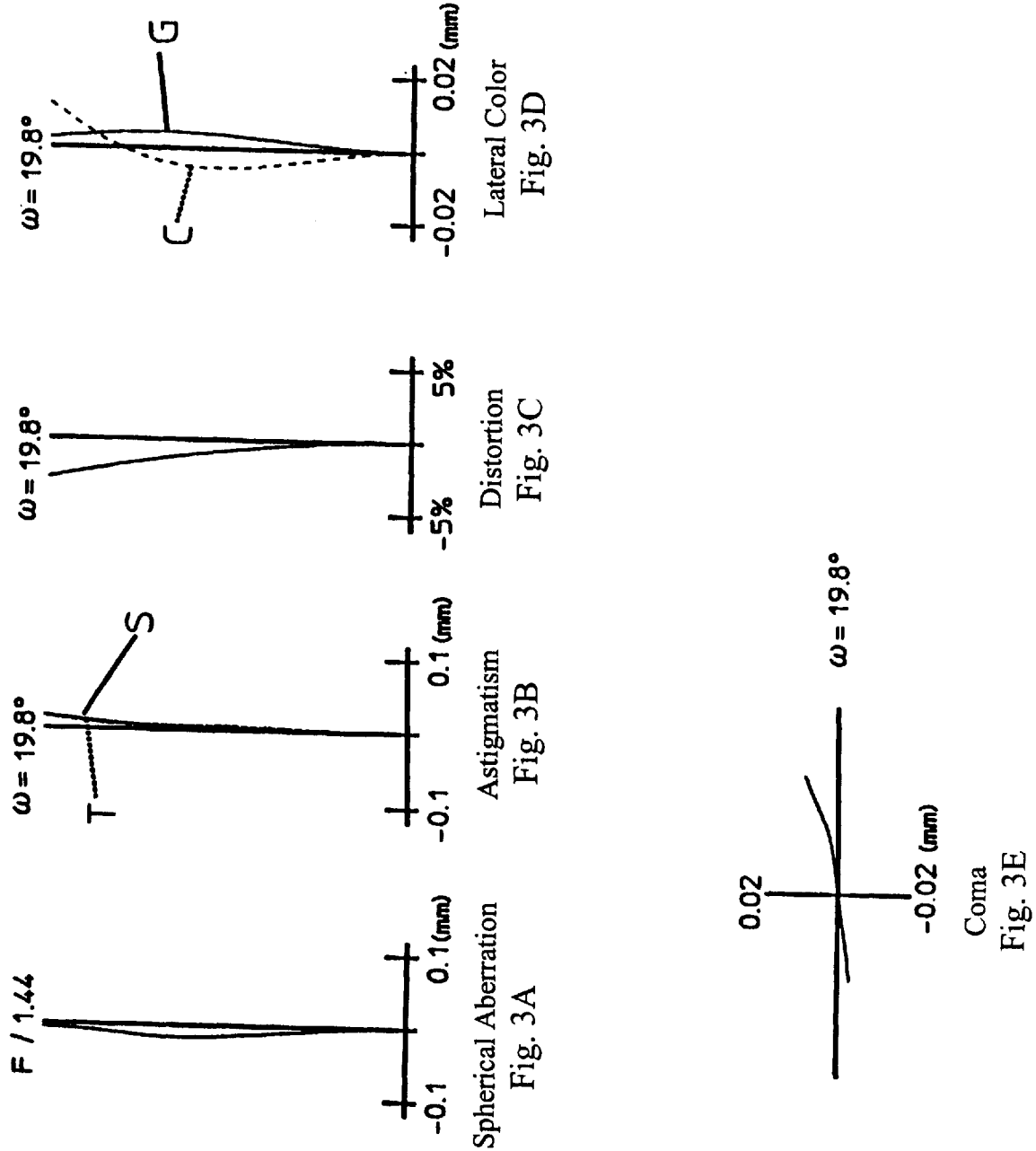

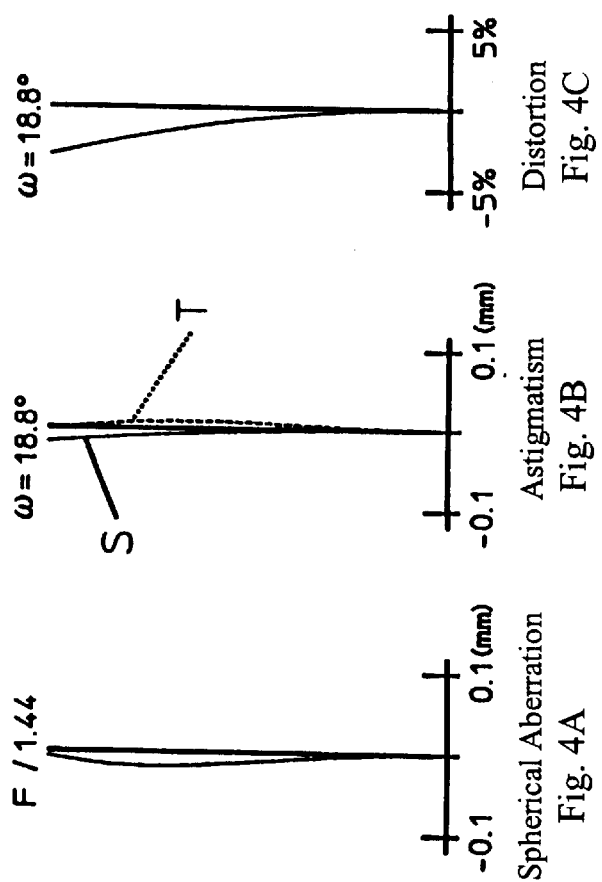
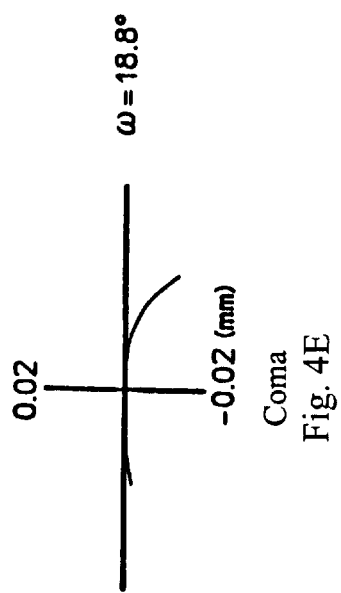
Spherical Aberration
Fig. 4A
Astigmatism
Fig. 4B
Distortion
Fig. 4C
Lateral Color
Fig. 4D
Coma
Fig. 4E

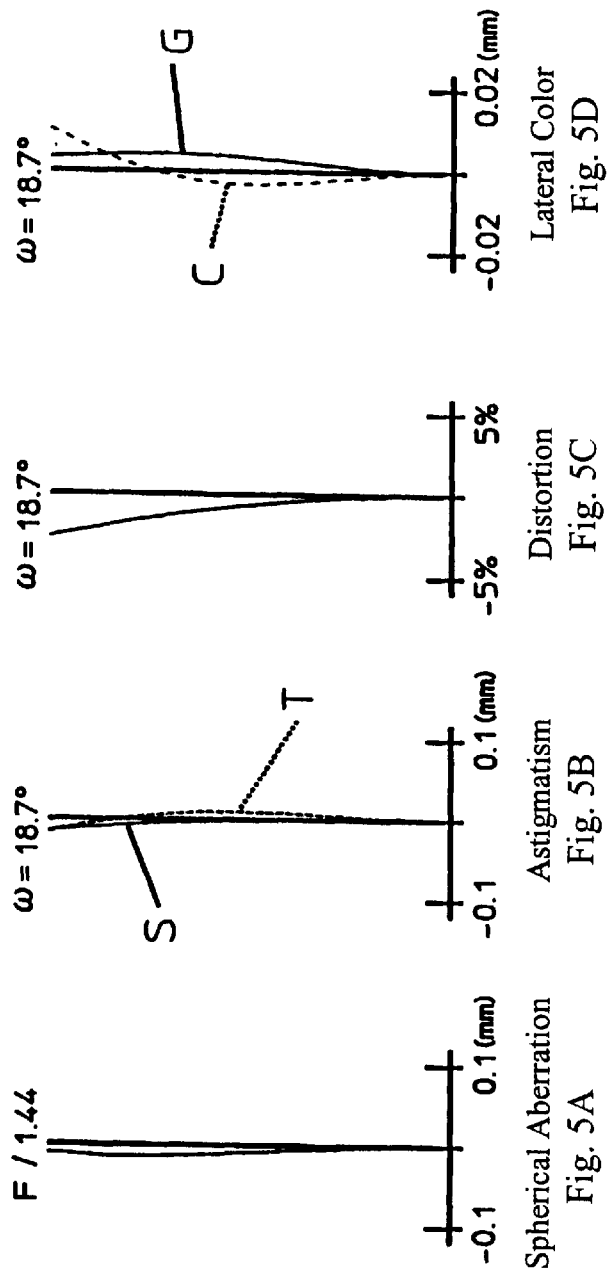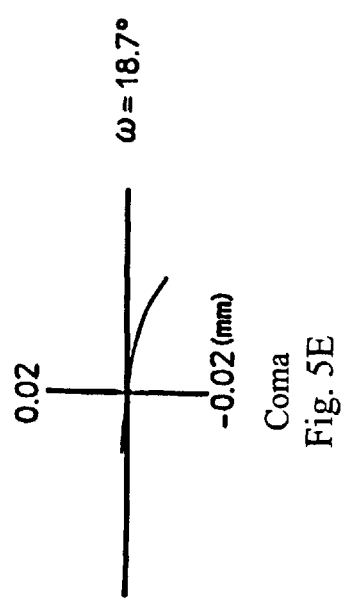

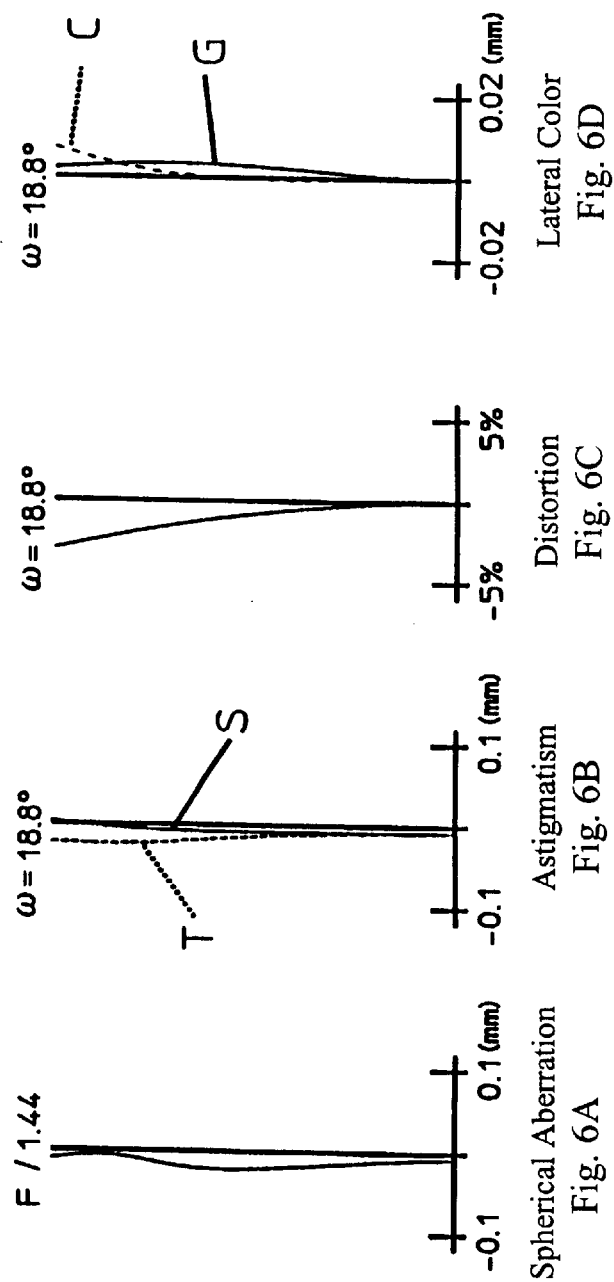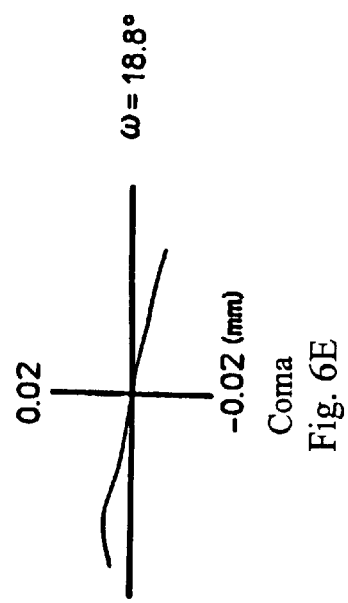

RETRO-FOCUS-TYPE CAMERA LENS

BACKGROUND OF THE INVENTION

Generally, a three-color separation optical system is arranged between a lens and the image pick-up planes in a commercial-grade video camera lens that uses three solid-state image pick-up elements. Therefore, a very long back focus has been desired for such a lens in order to accommodate the three-color separation optical system. Recently, solid-state image pick-up elements with a large number of picture elements have been developed in order to obtain a high picture quality. This, in turn, has caused a correspondingly high performance requirement for the camera lens. A so-called retro-focus-type lens has frequently been used to provide a long back focus lens, and such optical systems as disclosed, for example, in Japanese Laid-open Patent Applications H5-134147, and H9-292565 are known.

However, the retro-focus-type lens described in H5-134147 does not form a bright image due to the $F_{NO}$ being higher than 1.4. Although a bright image is achieved using the F/1.4 lens described in H9-292565, neither of these lenses is satisfactory in terms of optical performance. Thus, room for lens design improvement exists.

In the case of arranging a three-color separation optical system between a lens and an image pick-up plane, the problem of color shading must be considered. Color shading is a phenomenon that results from the incidence angles of rays onto a dichroic film being different, causing the light path lengths within the thin film to be different. This, in turn, causes the spectral characteristics of a dichroic film to vary, depending on the incidence angle. This, for example, can result in the outgoing rays from a dichroic film which contribute to the upper part versus the lower part of a picture having different colors. Thus, in a wide-angle lens that employs a three-color separation optical system, it is desirable to suppress the occurrence of color shading and to favorable correct various aberrations.

BRIEF SUMMARY OF THE INVENTION

The present invention is a fixed-focus-type camera lens which may be employed in electronic cameras, etc., that use a solid-state image pick-up element. More particularly, the objects of the present invention are to provide a retro-focus-type lens which has a field angle of about 38°, an $F_{NO}$ as low as 1.4, so as to provide a high quality image that is especially suitable for HDTV, and which suppresses color shading and has a long back focus.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 3A–3E show the spherical aberration, astigmatism, distortion, lateral color, and coma, respectively, of the retro-focus-type camera lens of Embodiment 1;

FIGS. 4A–4E show the spherical aberration, astigmatism, distortion, lateral color, and coma, respectively, of the retro-focus-type camera lens of Embodiment 2;

FIGS. 5A–5E show the spherical aberration, astigmatism, distortion, lateral color, and coma, respectively, of the retro-focus-type camera lens of Embodiment 3; and FIGS. 6A–6E show the spherical aberration, astigmatism, distortion, lateral color, and coma, respectively, of the retro-focus-type camera lens of Embodiment 4.

DETAILED DESCRIPTION

The retro-focus-type camera lens of the present invention is formed of, in order from the object side, a front lens group having negative refractive power, a diaphragm, and a rear lens group having positive refractive power. The front lens group is formed of, in order from the object side, a positive lens element and two negative lens elements. The rear lens group is formed of, in order from the object side, a positive lens element, two lenses that are each formed of two lens elements that are cemented together, and a positive lens element. In addition, the following Conditions (1)–(4) are, preferably, satisfied:

| | |
|---|---|
| $0.85 < |f_F/f_R| < 1.4$ | Condition (1) |
| $2.6 < |f_1/f_{23}| < 4.4$ | Condition (2) |
| $1.8 < D_{FR}/f < 3.8$ | Condition (3) |
| $v_d > 70.0$ | Condition (4) | where $f_F$ is the focal length of the front lens group, in order from the object side, $f_R$ is the focal length of the rear lens group, in order from the object side, $f_1$ is the focal length of the first lens element, in order from the object side, $f_{23}$ is the resultant focal length of the second and third lens elements, in order from the object side, $D_{FR}$ is the air spacing between the front lens group and the rear lens group, f is the focal length of the retro-focus-type camera lens, and $v_d$ is the average of the Abbe numbers of the positive lens elements in the rear lens group.

In the present invention, it is preferable that the front lens group is formed of, in order from the object side, a positive meniscus lens element, a negative meniscus lens element, and a biconcave lens element. Likewise, it is preferable that the rear lens group is formed of, in order from the object side, a positive lens element, a negative/positive cemented lens, a positive/negative cemented lens and a biconvex lens element.

The present invention will now be described in detail, with reference to the drawings.

Figure 1:
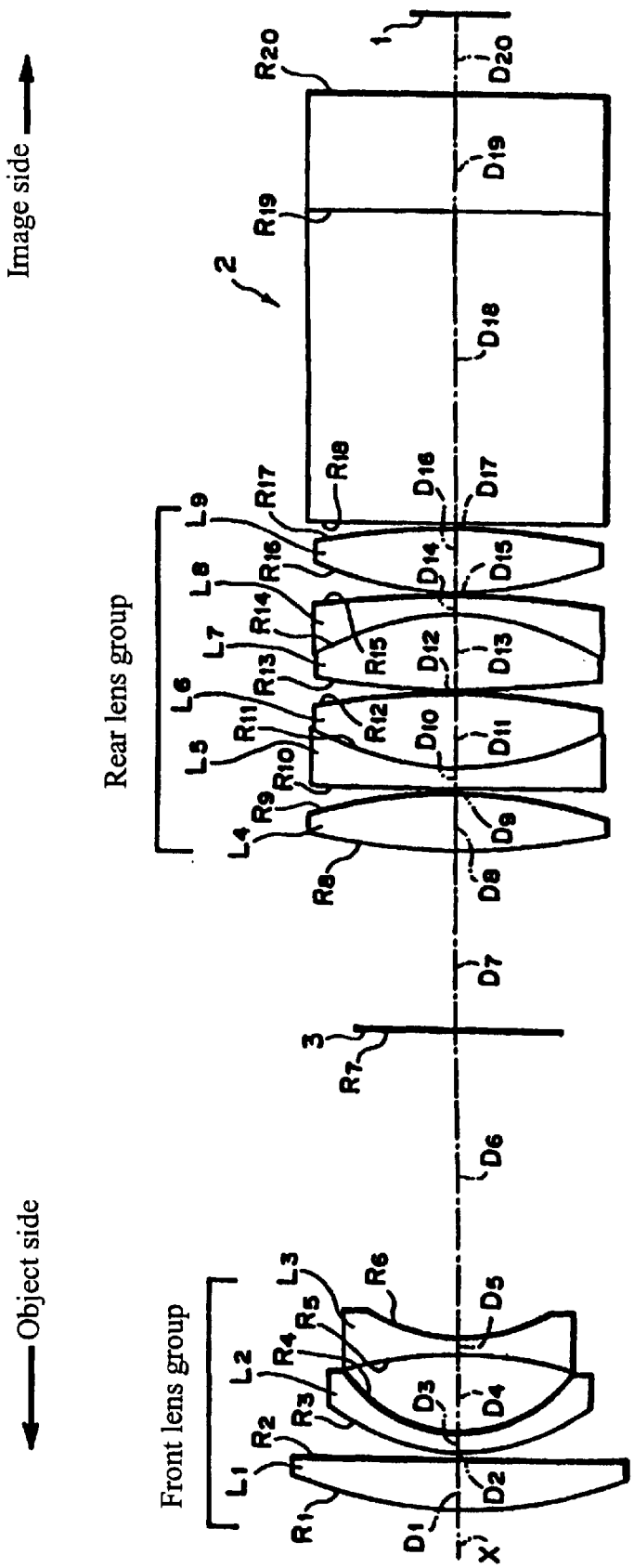
FIG. 1 shows the basic lens element configuration of a retro-focus-type camera lens according to Embodiments 1 and 4.

FIG. 1 is a diagram showing the construction of a retro-focus-type camera lens relating to Embodiments 1 and 4 of the present invention.

As shown in FIG. 1, the retro-focus-type camera lens of Embodiments 1 and 4 is formed of, in order from the object side, a front lens group having negative refractive power, a diaphragm 3, and a rear lens group having positive refractive power. The front lens group is formed of, in order from the object side, a positive lens element and two negative lens elements, and the rear lens group is formed of, in order from the object side, a positive lens element, two sets of cemented lenses, and a positive lens element. Further, the above Conditions (1)–(4) are satisfied.

Described in more detail, the front lens group is formed of, in order from the object side, a positive meniscus lens element $L_1$, a negative meniscus lens element $L_2$, and a biconcave lens element $L_3$, and the rear lens group is formed of, in order from the object side, a positive lens element $L_4$, a cemented lens formed of a negative lens element $L_5$ that is joined to a positive lens element $L_6$, a cemented lens formed of a positive lens element $L_7$ that is joined to a negative lens element $L_8$, and a biconvex lens element $L_9$.

An incident light beam is imaged by the retro-focus-type camera lens onto surface 1 of a charge coupled device (CCD) via a conventional three-color separation optical system 2. Moreover, X in FIG. 1 is the optical axis.

The purpose of Conditions (1)–(4) will now be described in detail. Condition (1) specifies the ratio of the focal length of the front lens group divided by the focal length of the rear lens group. If the lower limit of Condition (1) is not satisfied, negative distortion increases and coma aberration at the periphery of a picture becomes difficult to correct. Moreover, the occurrence of color shading cannot be prevented because the exit pupil cannot be made sufficiently distant.

On the other hand, if the ratio of the focal length of the front lens group divided by the focal length of the rear lens group exceeds the upper limit of Condition (1), the back focus becomes too short and negative curvature of field becomes excessive.

As described above, color shading arises where light has different angles of incidence onto dichroic film used in a three-color separation optical system 2. In order to suppress the occurrence of color shading, the position of the exit pupil must be made distant from the dichroic film so as to decrease the difference in angularity of rays in different field regions of the image to be recorded.

In this embodiment, the angle that a principal ray from the corner regions of a picture to be recorded makes with the optical axis X and that passes through the central position of the diaphragm 3 is made to be very small by satisfying Condition (1). In fact, such a ray is nearly telecentric. Thus, color shading is minimized.

Condition (2) specifies the negative/positive refractive power allocation of the lens elements in the front lens group. If the lower limit of Condition (2) is not satisfied, the distortion and the coma become difficult to correct. If the upper limit of Condition (2) is not satisfied, excessive negative curvature of field results and the back focus may become too short for insertion of the three-color separation optical system 2.

Condition (3) specifies the on-axis spacing between the front lens group and the rear lens group relative to the overall focal length f of the retro-focus-type camera lens. If the lower limit of Condition (3) is not satisfied, the refractive powers of the front lens group and the rear lens group strengthen, thus negative distortion caused by the front lens group and negative spherical aberration caused by the rear lens group become difficult to correct. On the other hand, if the spacing exceeds the upper limit of Condition (3), the correction of coma becomes difficult because the lens system becomes large and the quantity of incident abaxial light rays increases.

Condition (4) specifies the average of the Abbe numbers of all positive lens elements of the rear lens group. If the lower limit of Condition (4) is not satisfied, the lateral color becomes difficult to fully correct.

In addition to satisfying the above Conditions (1)–(4), if the following Condition (5) is satisfied the distortion and the spherical aberration can be markedly improved:

$$3.0 < D_{FR}/f < 3.8 \qquad \text{Condition (5)}$$

where $D_{FR}$ and f are as defined above.

Various embodiments of the present invention will now be described in detail.

Embodiment 1

The basic lens element configuration for this embodiment is shown in FIG. 1. Namely, a front lens group is formed of, in order from the object side, a first lens element $L_1$ of positive refractive power and a meniscus shape with its convex surface on the object side, a second lens element $L_2$ of negative refractive power and a meniscus shape with its convex surface on the object side, and a third lens element $L_3$ formed of a biconcave lens element having surfaces of different radii of curvature, with the surface of smaller radius of curvature on the image side.

A rear lens group is formed of, in order from the object side, a fourth lens element $L_4$ that is biconvex having surfaces of different radii of curvature, with the surface of smaller radius of curvature on the image side, a fifth lens element $L_5$ that is biconcave having surfaces of different radii of curvature, with the surface of smaller radius of curvature on the image side, a sixth lens element $L_6$ that is biconvex having surfaces of different radii of curvature, with the surface of smaller radius of curvature on the object side, a seventh lens element $L_7$ that is biconvex having surfaces of different radii of curvature, with the surface of smaller radius of curvature on the image side, an eighth lens element $L_8$ that has negative refractive power and is of meniscus shape, with its concave surface on the object side, and a ninth lens element $L_9$ that is biconvex having surfaces of different radii of curvature with the surface of smaller radius of curvature on the object side. Moreover, the fifth lens element $L_5$ and the sixth lens element $L_6$, are cemented to formed a joined lens having positive overall refractive power, and the seventh lens element $L_7$ and the eighth lens element $L_8$ are cemented so as to form a joined lens having positive overall refractive power. A diaphragm 3 is positioned between the front and rear lens groups.

Table 1 below lists the surface number #, in order from the object side, the radius of curvature R (in mm) of each surface, the on-axis spacing D (in mm) between surfaces, as well as the index of refraction $N_d$ and the Abbe number $v_d$ (both at the d-line) of each optical element of the retro-focus-type camera lens of Embodiment 1 and its associated beam-separating optical system 2. In the middle portion of the table are given the values of the focal length f (in mm), the F number $F_{NO}$, the back focus Bf (in mm), and the half-image angle ω of the retro-focus-type camera lens of this embodiment. In the lower portion of the table are listed the values relating to Conditions (1)–(4) for this embodiment.

TABLE 1

| # | R | D | $N_d$ | $V_d$ |
|---|---|---|---|---|
| 1 | 48.79 | 5.14 | 1.83356 | 35.1 |
| 2 | 824.74 | 0.83 | | |
| 3 | 22.60 | 2.04 | 1.49506 | 65.1 |
| 4 | 14.78 | 8.29 | | |
| 5 | −44.70 | 1.91 | 1.64664 | 59.2 |
| 6 | 18.09 | 33.03 | | |
| 7 | ∞ (stop) | 19.52 | | |
| 8 | 69.68 | 6.35 | 1.57111 | 41.4 |
| 9 | −50.52 | 0.45 | | |
| 10 | −12266.88 | 2.10 | 1.84481 | 42.6 |
| 11 | 31.44 | 8.25 | 1.49700 | 81.5 |
| 12 | −71.00 | 0.27 | | |
| 13 | 106.73 | 8.27 | 1.60300 | 65.4 |

TABLE 1-continued

| # | R | D | $N_d$ | $V_d$ |
|---|---|---|---|---|
| 14 | −26.88 | 2.07 | 1.83741 | 42.1 |
| 15 | −108.56 | 0.29 | | |
| 16 | 40.03 | 7.07 | 1.43425 | 95.0 |
| 17 | −70.23 | 0.00 | | |
| 18 | ∞ | 33.00 | 1.60859 | 46.5 |
| 19 | ∞ | 13.20 | 1.51633 | 64.1 |
| 20 | ∞ | | | | f = 15.71
$F_{NO}$ = 1.44
Bf = 54.77
ω = 19.8°
Condition (1) value: $|f_F/f_R|$ = 0.89
Condition (2) value: $|f_1/f_{23}|$ = 4.02
Condition (3) value: $D_{FR}/f$ = 3.34
Condition (4) value: $v_d$ = 70.8

As shown in the middle portion of the table, the retro-focus-type camera lens of this embodiment has a focal length f of 15.71 mm, an $F_{NO}$ of 1.44, a back focus Bf of 54.37 mm, and a half-image angle ω of 19.8°. Thus, the image has an angular field of 39.6°. As the total on-axis the beam-separating optical system 2 is 46.20 mm (D18+D19) and the back focus is 54.77 mm, this leaves a distance of 8.57 mm between the final surface of the beam-separating optical and the image plane. As is apparent from comparing the values of the variables shown in portion of Table 1 with the corresponding Conditions (1)–(4) given above, Embodiment 1 satisfies all of the Conditions (1)–(4), thereby suppressing the occurrence of color shading and providing a sufficient back focus so as to accommodate the beam-separating optical system 2.

Embodiment 2

Figure 2:
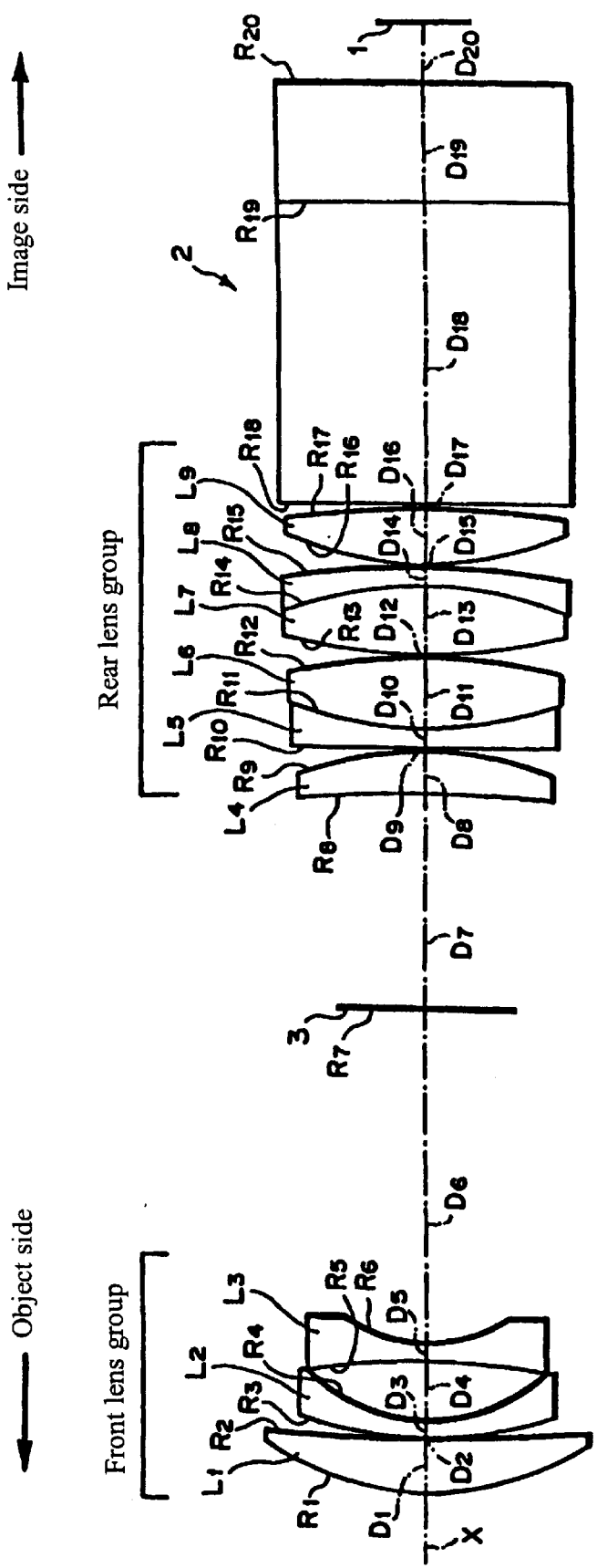
FIG. 2 shows the basic lens element configuration of a retro-focus-type camera lens according to Embodiments 2 and 3.

The basic lens element configuration of the retro-focus-type lens of this embodiment is shown in FIG. 2, which differs from Embodiment 1 in that the fourth lens element $L_4$ in this embodiment is a positive meniscus lens with its convex surface on the image side.

Table 2 below lists the surface number #, in order from the object side, the radius of curvature R (in mm) of each surface, the on-axis spacing D (in mm) between surfaces, as well as the index of refraction $N_d$ and the Abbe number $v_d$ (both at the d-line) of each optical element of the retro-focus-type camera lens of Embodiment 2 and its associated beam-separating optical system 2. In the middle portion of the table are given the values of the focal length f (in mm), the F number $F_{NO}$, the back focus Bf (in mm), and the half-image angle ω of the retro-focus-type camera lens of this embodiment. In the lower portion of the table are listed the values relating to Conditions (1)–(4) for this embodiment.

TABLE 2

| # | R | D | $N_d$ | $V_d$ |
|---|---|---|---|---|
| 1 | 30.60 | 6.00 | 1.75729 | 43.5 |
| 2 | 194.46 | 0.20 | | |
| 3 | 48.56 | 1.64 | 1.49027 | 70.3 |
| 4 | 18.23 | 6.67 | | |
| 5 | −79.44 | 1.51 | 1.48996 | 80.0 |
| 6 | 16.15 | 36.26 | | |
| 7 | ∞ (stop) | 24.19 | | |
| 8 | −143.68 | 4.68 | 1.50258 | 54.3 |
| 9 | −40.74 | 0.36 | | |

TABLE 2-continued

| # | R | D | $N_d$ | $V_d$ |
|---|---|---|---|---|
| 10 | −2678.29 | 2.13 | 1.84413 | 42.7 |
| 11 | 41.18 | 7.87 | 1.49700 | 81.5 |
| 12 | −67.56 | 0.20 | | |
| 13 | 62.84 | 7.35 | 1.60300 | 65.4 |
| 14 | −43.51 | 2.28 | 1.84101 | 42.1 |
| 15 | −110.92 | 0.20 | | |
| 16 | 38.46 | 6.19 | 1.43425 | 95.0 |
| 17 | −103.02 | 0.00 | | |
| 18 | ∞ | 33.00 | 1.60859 | 46.5 |
| 19 | ∞ | 13.20 | 1.51633 | 64.1 |
| 20 | ∞ | | | | f = 16.67
$F_{NO}$ = 1.44
Bf = 53.01
ω = 18.8°
Condition (1) value: $|f_F/f_R|$ = 1.37
Condition (2) value: $|f_1/f_{23}|$ = 2.71
Condition (3) value: $D_{FR}/f$ = 3.63
Condition (4) value: $v_d$ = 74.1

As shown in the middle portion of the table, the retro-focus-type lens of this embodiment has a focal length of 16.67 mm, an $F_{NO}$ of 1.44, a back focus of 53.01, and a half-image angle ω of 18.8°. Thus, the image has an angular field of 37.6°. As the total on-axis length of the beam-separating optical system 2 is 46.20 mm (D18+D19) and the back focus is 53.01 mm, this leaves a distance of 6.81 mm between the final surface of the beam-separating optical system 2 and the image plane. As is apparent from comparing the values of the variables shown in the lower portion of Table 2 with the corresponding Conditions (1)–(4) given above, Embodiment 2 satisfies all of the Conditions (1)–(4), while suppressing the occurrence of color shading and providing a sufficient back focus so as to accommodate the beam-separating optical system 2.

Embodiment 3

The basic lens element configuration of Embodiment 3 is the same as that of Embodiment 2, and thus is also illustrated by FIG. 2.

Table 3 below lists the surface number #, in order from the object side, the radius of curvature R (in mm) of each surface, the on-axis spacing D (in mm) between surfaces, as well as the index of refraction $N_d$ and the Abbe number $v_d$ (both at the d-line) of each optical element of the retro-focus-type camera lens of Embodiment 3 and its associated beam-separating optical system 2. In the middle portion of the table are given the values of the focal length f (in mm), the F number $F_{NO}$, the back focus Bf (in mm), and the half-image angle ω of the retro-focus-type camera lens of this embodiment. In the lower portion of the table are listed the values relating to Conditions (1)–(4) for this embodiment.

TABLE 3

| # | R | D | $N_d$ | $V_d$ |
|---|---|---|---|---|
| 1 | 33.53 | 5.66 | 1.76376 | 43.0 |
| 2 | 157.75 | 0.20 | | |
| 3 | 35.57 | 3.05 | 1.47440 | 69.6 |
| 4 | 16.16 | 7.21 | | |
| 5 | −75.06 | 1.85 | 1.49001 | 80.0 |
| 6 | 17.14 | 37.13 | | |
| 7 | ∞ (stop) | 24.98 | | |
| 8 | −802.40 | 5.30 | 1.50594 | 53.7 |

TABLE 3-continued

| # | R | D | $N_d$ | $V_d$ |
|---|---|---|---|---|
| 9 | −41.86 | 0.20 | | |
| 10 | −352.77 | 2.00 | 1.84482 | 42.6 |
| 11 | 40.75 | 7.70 | 1.49700 | 81.5 |
| 12 | −72.43 | 0.20 | | |
| 13 | 64.43 | 7.19 | 1.60300 | 65.4 |
| 14 | −48.21 | 2.00 | 1.84366 | 41.9 |
| 15 | −113.44 | 0.20 | | |
| 16 | 34.81 | 6.10 | 1.43425 | 95.0 |
| 17 | −150.86 | 0.00 | | |
| 18 | ∞ | 33.00 | 1.60859 | 46.5 |
| 19 | ∞ | 13.20 | 1.51633 | 64.1 |
| 20 | ∞ | | | | f = 16.66
$F_{NO}$ = 1.44
Bf = 53.04
ω = 18.7°
Condition (1) value: $|f_F/f_R|$ = 1.37
Condition (2) value: $|f_1/f_{23}|$ = 2.95
Condition (3) value: $D_{FR}/f$ = 3.73
Condition (4) value: $v_d$ = 73.9

As shown in the middle portion of the table, the retro-focus-type lens of this embodiment has a focal length of 16.66 mm, an $F_{NO}$ of 1.44, a back focus of 53.04 mm, and a half-image angle ω of 18.7°. Thus, the image has an angular field of 37.4°. As the total length of the beam-separating optical system 2 is 46.20 mm (D18+D19), and the back focus is 53.04 mm, this leaves a distance of 6.84 mm between the final surface of the beam-separating optical system 2 and the image plane. As is apparent from comparing the values of the variables shown in the lower portion of Table 3 with the corresponding Conditions (1)–(4) given above, Embodiment 3 satisfies all of the Conditions (1)–(4), while suppressing the occurrence of color shading and providing a sufficient back focus so as to accommodate the beam-separating optical system 2.

Embodiment 4

The basic lens element configuration of Embodiment 4 is the same as that of Embodiment 1, and thus is illustrated by FIG. 1.

Table 4 below lists the surface number #, in order from the object side, the radius of curvature R (in mm) of each surface, the on-axis spacing D (in mm) between surfaces, as well as the index of refraction $N_d$ and the Abbe number $v_d$ (both at the d-line) of each optical element of the retro-focus-type camera lens of Embodiment 4 and its associated beam-separating optical system 2. In the middle portion of the table are given the values of the focal length f (in mm), the F number $F_{NO}$, the back focus Bf (in mm), and the half-image angle ω of the retro-focus-type camera lens of this embodiment. In the lower portion of the table are listed the values relating to Conditions (1)–(4) for this embodiment.

TABLE 4

| # | R | D | $N_d$ | $V_d$ |
|---|---|---|---|---|
| 1 | 47.23 | 4.99 | 1.80393 | 39.7 |
| 2 | 844.76 | 1.10 | | |
| 3 | 22.27 | 1.74 | 1.45262 | 68.5 |
| 4 | 14.03 | 8.63 | | |
| 5 | −35.15 | 2.66 | 1.55339 | 93.8 |
| 6 | 14.72 | 21.52 | | |
| 7 | ∞ (stop) | 10.14 | | |

TABLE 4-continued

| # | R | D | $N_d$ | $V_d$ |
|---|---|---|---|---|
| 8 | 107.85 | 6.99 | 1.53553 | 48.1 |
| 9 | −30.71 | 0.68 | | |
| 10 | −81.02 | 3.10 | 1.83957 | 43.1 |
| 11 | 34.57 | 8.43 | 1.49700 | 81.5 |
| 12 | −40.02 | 0.33 | | |
| 13 | 119.54 | 8.59 | 1.60300 | 65.4 |
| 14 | −27.04 | 2.75 | 1.84472 | 41.7 |
| 15 | −60.74 | 0.23 | | |
| 16 | 36.26 | 6.88 | 1.43425 | 95.0 |
| 17 | −80.64 | 0.00 | | |
| 18 | ∞ | 33.00 | 1.60859 | 46.5 |
| 19 | ∞ | 13.20 | 1.51633 | 64.1 |
| 20 | ∞ | | | | f = 16.67
$F_{NO}$ = 1.44
Bf = 53.13
ω = 18.8°
Condition (1) value: $|f_F/f_R|$ = 0.92
Condition (2) value: $|f_1/f_{23}|$ = 4.35
Condition (3) value: $D_{FR}/f$ = 1.90
Condition (4) value: $v_d$ = 72.5

As shown in the middle portion of the table, the retro-focus-type lens of this embodiment has a focal length of 16.67 mm, an $F_{NO}$ of 1.44, a back focus of 53.13 mm, and a half-image angle ω of 18.8°. Thus, the image has an angular field of 37.6°. As the total length of the beam-separating optical system 2 is 46.20 mm (D18+D19) and the back focus is 53.13 mm, this leaves a distance of 6.93 mm between the final surface of the beam-separating optical system 2 and the image plane. As is apparent from comparing the values of the variables shown in the lower portion of Table 4 with the corresponding Conditions (1)–(4) given above, Embodiment 4 satisfies all of the Conditions (1)–(4), while suppressing the occurrence of color shading and providing a sufficient back focus so as to accommodate the beam-separating optical system 2.

FIGS. 3A–3E show the spherical aberration, astigmatism, distortion, lateral color, and coma, respectively, of the retro-focus-type camera lens of Embodiment 1, and FIGS. 4A–4E, 5A–5E, and 6A–6E illustrates these aberrations for Embodiments 2, 3 and 4, respectively. Moreover, the half-image angle ω is shown in these aberration charts. In FIGS. 3B, 4B, 5B and 6B, the astigmatism is shown for both the sagittal S and tangential T image planes. In FIGS. 3D, 4D, 5D, and 6D the lateral color is shown for both the C and G lines. From FIGS. 3A–6E it is clear that the retro-focus-type camera lenses relating to the Embodiments (1)–(4) have a wide field angle, form a bright image, and are favorably corrected for the various aberrations.

The invention being thus described, it will be obvious that the same may be varied in many ways. For example, the values of R and D in the tables may be appropriately scaled to achieve a lens of any desired focal length. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A retro-focus-type camera lens of fixed focal length comprising, in order from the object side:

a front lens group having negative refractive power;
a diaphragm; and
a rear lens group having positive refractive power;

wherein
the front lens group is formed of, in order from the object side, a positive lens element and two negative lens elements; and
the rear lens group is formed of, in order from the object side, a positive lens element, two cemented lenses that are each formed of two lens elements that are cemented together, and a positive lens element;
wherein the following condition is satisfied $$0.85 < |f_F/f_R| < 1.4$$

where
$f_F$ is the focal length of the front lens group, and
$f_R$ is the focal length of the rear lens group.

2. The retro-focus-type camera lens as described in claim 1, wherein the following condition is also satisfied:

$$2.6 < |f_1/f_{23}| < 4.4$$

where
$f_1$ is the focal length of the first lens element, in order from the object side, and
$f_{23}$ is the resultant focal length of the second and third lens elements, in order from the object side.

3. The retro-focus-type camera lens as described in claim 1, wherein the following condition is also satisfied:

$$1.8 < D_{FR}/f < 3.8$$

where
$D_{FR}$ is the on-axis air spacing between the front lens group and the rear lens group, and
f is the focal length of the retro-focus-type camera lens.

4. The retro-focus-type camera lens as described in claim 1, wherein the following condition is also satisfied:

$$v_d > 70.0$$

where
$v_d$ is the average of the Abbe numbers of the positive lens elements in the rear lens group.

5. The retro-focus-type camera lens as described in claim 1, wherein:
the front lens group is formed of, in order from the object side, a positive meniscus lens element, a negative meniscus lens element and a biconcave lens element, and
the rear lens group is formed of, in order from the object side, a positive lens element, a cemented lens formed of a negative lens element that is joined to a positive lens element, a cemented lens that is formed of a positive lens element that is joined to a negative lens element, and a biconvex lens element.

6. A retro-focus-type camera lens of fixed focal length comprising, in order from the object side:
a front lens group having negative refractive power;
a diaphragm; and
a rear lens group having positive refractive power;
wherein
the front lens group consists of in order from the object side, a positive lens element and two negative lens elements; and
the rear lens group is formed of, in order from the object side, a positive lens element, two lenses that are each formed of two lens elements that are cemented together, and a positive lens element.

* * * * *

UNITED STATES PATENT AND TRADEMARK OFFICE
CERTIFICATE OF CORRECTION

PATENT NO. : 6,621,641 B2
DATED : September 16, 2003
INVENTOR(S) : Takatsuki

It is certified that error appears in the above-identified patent and that said Letters Patent is hereby corrected as shown below:

Column 1,
Line 38, change "favorable" to -- favorably --;

Column 4,
Line 34, change "formed" to -- form --;

Column 5,
Line 23, change "on-axis" to -- on axis length of --;
Line 27, change "optical" to -- optical system 2 --;
Line 28, change "in" to -- in the lower --;

Column 8,
Line 42, change "illustrates" to -- illustrate --;
Line 57, change "Rather" to -- Rather, --; and Column 10,
Line 27, change "of in order" to -- of, in order --.

Signed and Sealed this

Ninth Day of December, 2003

JAMES E. ROGAN
*Director of the United States Patent and Trademark Office*